United States Patent [19]
Laurent et al.

[11] Patent Number: 4,895,692
[45] Date of Patent: Jan. 23, 1990

[54] MOLD FOR THE MOLDING AND VULCANIZING OF A RUBBER TIRE

[75] Inventors: Daniel Laurent, Meylan; Marc Sebe, Clermont-Ferrand, both of France

[73] Assignee: Compagnie Generale Des Establissements Michelin, Clermont-Ferrand, France

[21] Appl. No.: 265,326

[22] Filed: Oct. 27, 1988

Related U.S. Application Data

[63] Continuation of Ser. No. 40,353, Apr. 20, 1987, abandoned.

[30] Foreign Application Priority Data

Apr. 25, 1986 [FR] France ............... 86 06158

[51] Int. Cl.⁴ .............................. B29C 35/00
[52] U.S. Cl. .................... 264/326; 425/36; 425/47; 425/49; 425/54; 249/160
[58] Field of Search ............ 425/35, 36, 39, 46, 425/47, 49, 54–57; 249/160–162; 264/326

[56] References Cited

U.S. PATENT DOCUMENTS

| | | | |
|---|---|---|---|
| 1,388,255 | 8/1921 | Hardeman | 425/35 |
| 3,779,677 | 12/1973 | Greenwood | 425/46 |
| 3,833,323 | 9/1974 | Pasch | 425/47 |
| 3,847,520 | 11/1974 | Plumhans | 425/39 |
| 3,847,524 | 11/1974 | Plumhans | 425/39 |
| 3,852,006 | 12/1974 | Irie | 425/47 |
| 4,063,861 | 12/1977 | Schmidt et al. | 425/35 |
| 4,124,345 | 11/1978 | Grunner et al. | 425/54 |
| 4,259,129 | 3/1981 | Schmidt et al. | 264/326 |
| 4,279,856 | 7/1981 | Vente et al. | 425/54 |

FOREIGN PATENT DOCUMENTS

| | | |
|---|---|---|
| 765745 | 8/1967 | Canada . |
| 1402373 | 5/1965 | France . |
| 2480667 | 10/1981 | France . |
| 2529505 | 1/1984 | France . |
| 1109465 | 4/1968 | United Kingdom . |

*Primary Examiner*—Bernard Nozick
*Attorney, Agent, or Firm*—Brumbaugh, Graves, Donohue & Raymond

[57] ABSTRACT

A mold for molding and vulcanizing a rubber tire comprises a rigid core defining an interior surface of the tire, two side parts and a peripheral ring divided into a plurality of segments. In order to be able to close the mold, all the members are designed to slide on each other during final phase of their closing movement.

9 Claims, 4 Drawing Sheets

MOLD FOR THE MOLDING AND VULCANIZING OF A RUBBER TIRE

This application is a continuation of application Ser. No. 040,353, filed on Apr. 20, 1987, now abandoned.

BACKGROUND OF THE INVENTION

The present invention relates to a mold for molding and vulcanizing of a rubber tire.

In the manufacture of new tires, one type of mold has become of general use: It comprises two side parts, each serving for the exterior molding of a sidewall of a tire and, for the exterior molding of the tread, a peripheral ring divided into a plurality of segments having side faces perpendicular to the axis of the mold and radial transverse faces (see, for instance, U.S. Pat. No. 3,779,677). In order to close such a mold, the segments must be displaced radially towards the axis and the side parts brought axially towards each other. In the closed position these various members (side parts and segments) adjoin each other and define the exterior surface of the tire. The raw rubber blank of the future tire must be firmly applied and held against the mold in order to obtain the desired geometrical dimensions and in order, where applicable, to impress the pattern of the tread. For this, there is customarily used a flexible rubber membrane which is applied against the interior surface of the raw rubber blank by inflation to the required pressure, and which causes or tends to cause an expansion of the blank. In order to assure a molding of good quality, it is necessary that the raw rubber blank be subjected to a molding pressure of about 10 bars. This pressure is applied via the membrane. In order to limit the molding burrs as much as possible, it is desirable that the increase in pressure of the membrane take place only when the mold is in closed position. In order to avoid the appearance of these burrs, Canadian Patent No. 765,745 proposes making segments having parallel transverse faces. The peripheral ring therefore has alternately segments with parallel transverse faces and segments whose transverse faces are parallel to the transverse faces of the adjacent segments. Thus, at the end of the closing of the mold, the segments with parallel transverse faces can slide between the other segments, in the manner of a piston, which makes it possible to avoid pinching the raw rubber blank between two adjacent segments.

The molding and the vulcanizing of a rubber tire with the classical means, namely a segment mold for defining the exterior surface of the tire and a flexible rubber membrane to define the interior surface of the tire does not make it possible fully to control the shape and interior dimensions of the tire.

Another drawback resulting from the use of the molding and vulcanizing techniques of the prior art relates to the different thermal behaviors of the different members in contact with the tire during the vulcanizing, i.e., the metallic side parts and the peripheral ring of metal segments, on the one hand, and the rubber membrane, on the other hand. This complicates the establishing of the laws of vulcanization as well as the placing of them into practice.

On the other hand, it is also known to use a removable rigid core to define the interior surface of the blank of the future tire. By way of illustration, reference will be had, for instance, to U.S. Pat. No. 1,877,751. The rigid cores at times define a non-deformable molding space together with the exterior member. In practice, they can be used for the production of tires only by pouring or injecting a material in liquid or pasty state into the molding space. This is the process for the production of polyurethane tires which is illustrated, for instance, by U.S. Pat. No. 4,279 856.

However, if the rigid core supports a non-vulcanized tire blank made with the materials conventionally used in the tire industry (namely non-vulcanized rubber, textile and/or metal reinforcement elements), and this rigid core is associated with a segment mold of the customary type described in U.S. Pat. No. 3,779,677, the segments start to penetrate into the raw blank so as to impress the tread pattern therein well before the complete closing of the mold. When the mold is not completely closed, spaces are present between all the segments. The raw rubber can thus flow between the segments. Depending on the grooving ratio of the tread pattern and the resultant movements of raw rubber, this flow will cause extensive burrs and even the impossibility of assuring the proper closing of the mold due to the excessive amount of rubber present in the spaces, preventing the relative circumferential bringing together of the segments which is necessary in order to permit their radial movement up to complete closing.

SUMMARY OF THE INVENTION

In order to overcome all these drawbacks, the solution according to the invention consists in using a rigid mold in order to impose the final shape and dimensions to a tire made from a non-vulcanized rubber blank and to utilize the difference in expansion between the unvulcanized rubber and the material constituting the rigid mold resulting from the increase in temperature upon the vulcanization, in order to arrive at a suitable molding pressure.

A mold according to the invention for molding and vulcanizing a rubber tire having the following members:

(a) a removable rigid core defining an interior surface of the tire, (b) two side parts, each serving for exterior molding of a sidewall of the tire, (c) a peripheral ring divided into a plurality of segments assuring exterior molding of a tread, is characterized by the fact that all of the members define a molding space for the tire, and by the fact that all the members have a configuration such that they are in sliding relationship one on the other at least during final phase of closing movement of the mold.

DESCRIPTION OF THE DRAWING

The invention will be better understood by reference to the accompanying drawing and the description thereof, illustrating in non-limitative manner one particularly advantageous embodiment of the mold according to the invention.

DETAILED DESCRIPTION OF THE INVENTION

Figure 1:
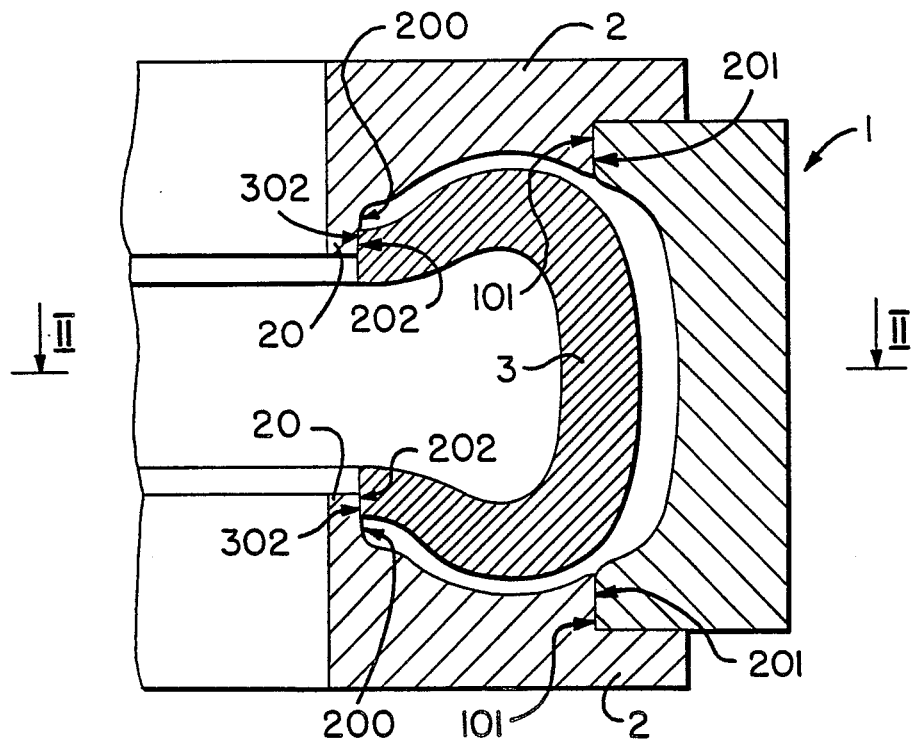
FIG. 1 is a schematic partial radial cross section of a first embodiment of the mold according to the invention, shown in closed position.

The mold according to the invention is formed of the following members: a peripheral ring 1 divided into a plurality of segments assuring exterior molding of a tread, two side parts 2, each serving for exterior molding of a sidewall of a tire, and a removable rigid core 3 defining an interior surface of the tire. In this way, the members of the mold assure the molding of the exterior and interior surfaces of the tire and therefore completely define a molding space for the tire.

The mold according to the invention makes it possible to mold and vulcanize a tire with a geometrical precision which is far greater than that which can be obtained by the conventional method of molding with a flexible membrane, because all the members of the mold which establish the final geometry of the tire are rigid, while in the customary technique it is necessary to take possible deformations and the behavior of the inflatable membrane into account. By "rigid" there is to be understood "substantially non-deformable" as compared with an inflatable vulcanization membrane which, by definition and construction, is highly deformable as compared with the other parts of a conventional mold which undergo only very slight elastic deformations due to the stresses exerted by the molding pressure. As a result, it is possible to produce a far greater variety of shapes, from which the designer of tires can fully profit. The vulcanization is therefore effected with constant volume instead of at constant pressure as in the case of the customary technique. The fact that, with the mold of the invention it is possible to employ a different molding pressure in the different zones of the tire also constitutes an additional plus value.

The molding of the interior surface of the tire is assured by a core having rigidity as its essential characteristic so as to make it possible to select among the vast number of materials which make it possible to obtain this characteristic. In particular, the core can be metallic like the other parts of the mold. The heat flow contributed from the interior to the tire is propagated then towards the raw rubber blank without encountering the thermal screen formed of the traditional inflatable membranes made of rubber. Furthermore, the heat exchange coefficient between such a metal core and the raw rubber blank is excellent, far better than upon the use of a flexible membrane. This constitutes another appreciable advantage of the invention. It is, in fact, possible to have a greatly reduced curing time without increasing the vulcanization temperature and therefore to increase the productivity of the vulcanization apparatus without any penalty with respect to the materials.

The elimination of recourse to a flexible membrane of rubber also constitutes an intrinsic advantage of the invention. The use of such a membrane is, in fact, expensive because its life is very short and because it makes it necessary to use, and therefore apply, anti-sticking products.

Furthermore, since the interior surface of the tire is defined by a rigid core while assuring that the closing of the mold is possible and that the molding will produce at the interfaces of the members of the mold only burrs of very small size which are compatible with a very high level of quality of the molded product, the rigid core can be used as support for the rubber tire blank from the very start of its manufacture. Due to the mold of the invention, one, to a very large extent, is independent of the properties of mechanical strength of the rubber mixes in unvulcanized state since these mixes are not stressed mechanically, contrary to what is the case when the tire blank undergoes in raw state shapings which are at times substantial. Thus the mold of the invention opens the way to the use of mixes different from those which could be used up to the present time in the manufacture of tires, whether homogeneous or heterogeneous, and in particular mixes which are less expensive and/or impart better performance to the tire.

Likewise, the elimination of recourse to the least shaping during the course of manufacture of the tire makes the manufacture much more precise, since the products which enter into the composition of the tire, once they have been placed on the rigid core, do not experience any further relative movements until the structure is set in place by the vulcanization. For example, the angle of lay of the reinforcement cords constituting the belt of a radial carcass tire no logger undergo variations due to these shapings.

FIG. 1 (first embodiment of the invention) shows that, in closed position, each segment of the peripheral ring 1 comes into concordance with the side parts 2 via contact surfaces 101. Each segment also has transverse faces (not visible in FIG. 1) which in closed position adjoin the transverse faces of the adjacent segments. The radially inner faces 302 of the core 3 come, in closed position, into contact with the corresponding faces 202 arranged in the extension 20 of each side part 2 beyond the zone 200 assuring the molding of the radially inner surface of the beads of the tire. These faces 202 and 302 are cylindrical and co-axial and such that they can slide one on the other in the manner of a piston in a bore.

Figure 2:
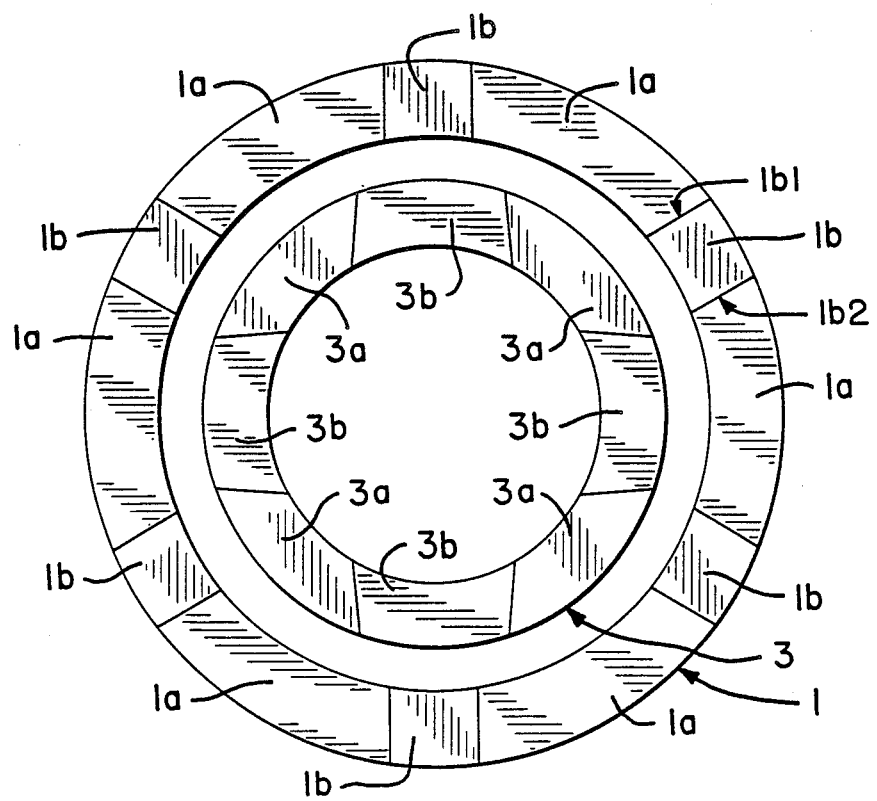
FIG. 2 is a section along the line II—II shown in FIG. 1.
Figure 3:
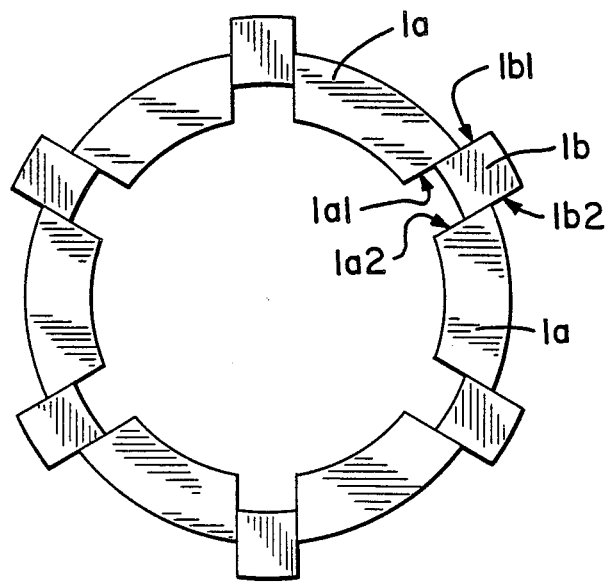
FIG. 3 is a plan view of the peripheral ring of segments, in partially open position, according to the first embodiment of the invention.

Referring more particularly to FIGS. 2 and 3, it can be seen that the segment mold of the first embodiment has a rigid core 3 and two types of segments (the segments of the first type called "type a" and designated by the reference 1a and the segments of the second type called "type b" and designated by the reference 1b) which are arranged alternately along the peripheral ring 1. The rigid core 3 is in its turn divided into elements of two types (3a and 3b) which are arranged alternately. The elements 3b of type b have transverse faces whose extensions intersect radially on the outside, and the elements 3a of type a are of complementary shape so as to define the interior surface of the tire, as described, for example, in U.S. Pat. No. 4,279,856. In this way, as the tire requires that the introduction and the removal of the elements of the removable rigid core be effected through the only access possible, namely between the beads of the tire and radially to the interior of each bead, it is always possible to terminate the assembling of the core and to commence its disassembly by elements 3b of type b, the latter having no mating back-off for radial movement towards the axis of the tire.

Returning now to the peripheral ring 1 of segments and in accordance with a similar principle, one of the two types of segments (type b) has transverse faces 1*b*1 and 1*b*2 which are parallel to each other, as taught in Canadian Patent No. 765,745, which makes it possible to obtain a piston effect upon the closing of the segments, by closing the segments of type a before the segments of type b.

The method of employing such a mold will now be described in detail, explaining the closing movements by reference to these same FIGS. 1, 2 and 3.

A core 3 formed of elements 3*a* and 3*b* of two complementary types is introduced into the interior of the raw rubber tire blank, as described above, or else the tire blank is constructed on the assembled core 3. The side parts 2 are then brought towards the core 3 which bears the raw blank of the tire until the extension 20 slide on the faces 302 of the core 3, without, however, going up to the closed position.

At this stage, the rubber is not yet placed under compression. The segments of the peripheral ring 1 are then brought to their closed position while respecting the kinematics for which they are designed, namely the segments 1*a* before the segments 1*b*. The blank supported by the rigid core 3 is in its final geometry before the mold is closed. Upon the radial moving together of the segments 1*a*, the molding of the tread pattern starts before the segments 1*a* are in closed position. In this way raw rubber flows on both sides of the said segments 1*a*. In the closed position of the segments 1*a* (see FIG. 3), all the transverse faces of the segments 1*a* and 1*b* adjoin each other in pairs, while the segments 1*b* are still retracted, at least in part. Since all the transverse faces adjoin each other (1*b*1 and 1*a*1, 1*b*2 and 1*a*2) the final radial bringing together of the segments 1*b* makes it possible to push back the raw rubber which has flowed under the effect of the molding by the segments 1*a* while assuring the complete molding of the tread.

Thus the segments of type 1*b*, acting in the manner of a piston between the segments of type 1*a*, make it possible to avoid pinching raw rubber between the transverse faces of the segments.

Finally, the side parts 2 are brought up to their closed position, which here again makes it possible to push back the rubber which has been able to flow on both sides of the peripheral ring 1 of segments. In fact, the contact surfaces between side parts 2 and peripheral ring 1 of segments are produced by a straight line which is constantly parallel to the last closing movement of the mold. In the embodiment described, each contact surface 101 and 201 is a cylinder whose axis is identical with that of the mold. In order to avoid any burr, the axial bringing together of the side parts 2 is therefore effected, at least in part, after the closing of all the segments 1*a* and 1*b*.

Figure 4:
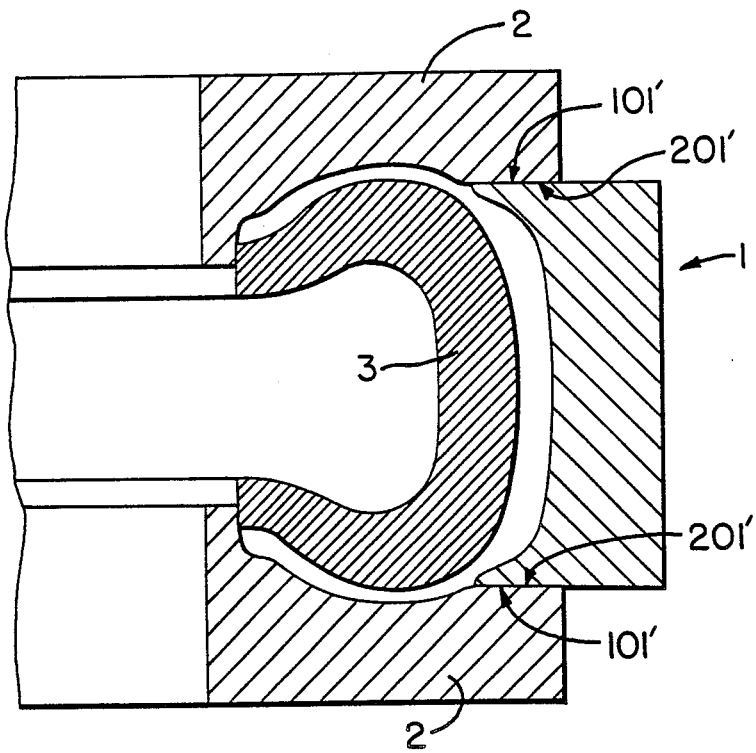
FIG. 4 is a schematic partial radial cross-section of a variant embodiment of a mold according the invention, shown in closed position.

As a variant shown in FIG. 4, each contact surface 101' and 201' can be generated by a straight line which is constantly perpendicular to the axis of the mold. In this case, the axial bringing together of the side parts up to their final position must precede any movement of closure of the segments 1*a* and 1*b*.

In order to obtain all the movements of the different elements of the mold which have just been indicated, the man skilled in the art may use any suitable means, in particular mechanical, hydraulic or pneumatic cylinder-piston devices.

It is therefore seen that the complete closing of the mold takes place by sliding of the members on each other without there ever being any movement of an edge of one member towards another member. Due to this, one can design a completely rigid mold which can, however, be closed, if necessary even requiring the application of a closing pressure to one or more of these members.

Figure 5:
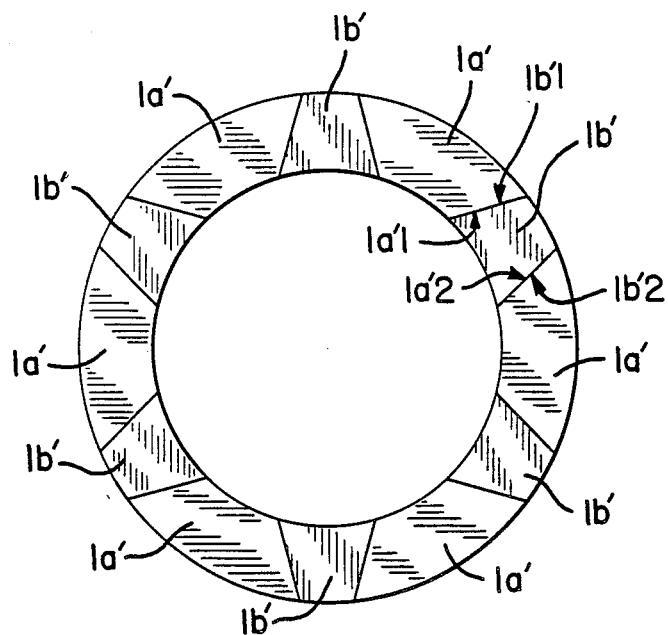
FIG. 5 is a plan view of the peripheral ring of segments, in closed position, according to another embodiment of the invention.
Figure 6:
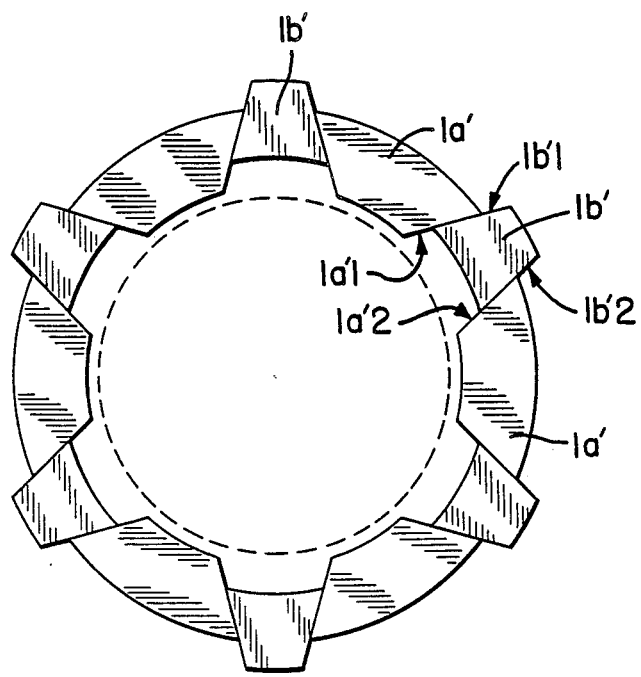
FIG. 6 is a plan view of the same peripheral ring of segments of FIG. 5, in partially open position.

FIGS. 5 and 6 illustrate another embodiment of a peripheral ring of segments of a mold according to the invention. This embodiment provides for a different arrangement of the transverse faces of the segments of the peripheral ring. Thus one can again prevent any pinching of a crude rubber blank between the side faces of the segments when the segment mold has two types of segments 1*a*' and 1*b*' arranged alternately along the periphery, one of the two types of segments (type b) having transverse faces 1*b*'1 and 1*b*'2 the radial extensions of which have an intersection radially to the outside of the mold, the other type of segment (type a) having, when the mold is in closed position, transverse faces 1*a*'1 and 1*a*'2 which adjoin the preceding faces 1*b*'1 and 1*b*'2. The movements of radial bringing together of the two types of segments must be coordinated. The method of using this embodiment of the mold of the invention is characterized by the fact that, at least in the final phase of closing of the mold, all the transverse faces of the segments adjoin each other in pairs and, the movement of the bringing together of the segments of type a being imposed, the bringing together of the segments of type b is effected in accordance with a kinematics imposed by the sliding of the transverse faces of the segments of type b on the transverse faces of the segments of type a.

Figure 7:
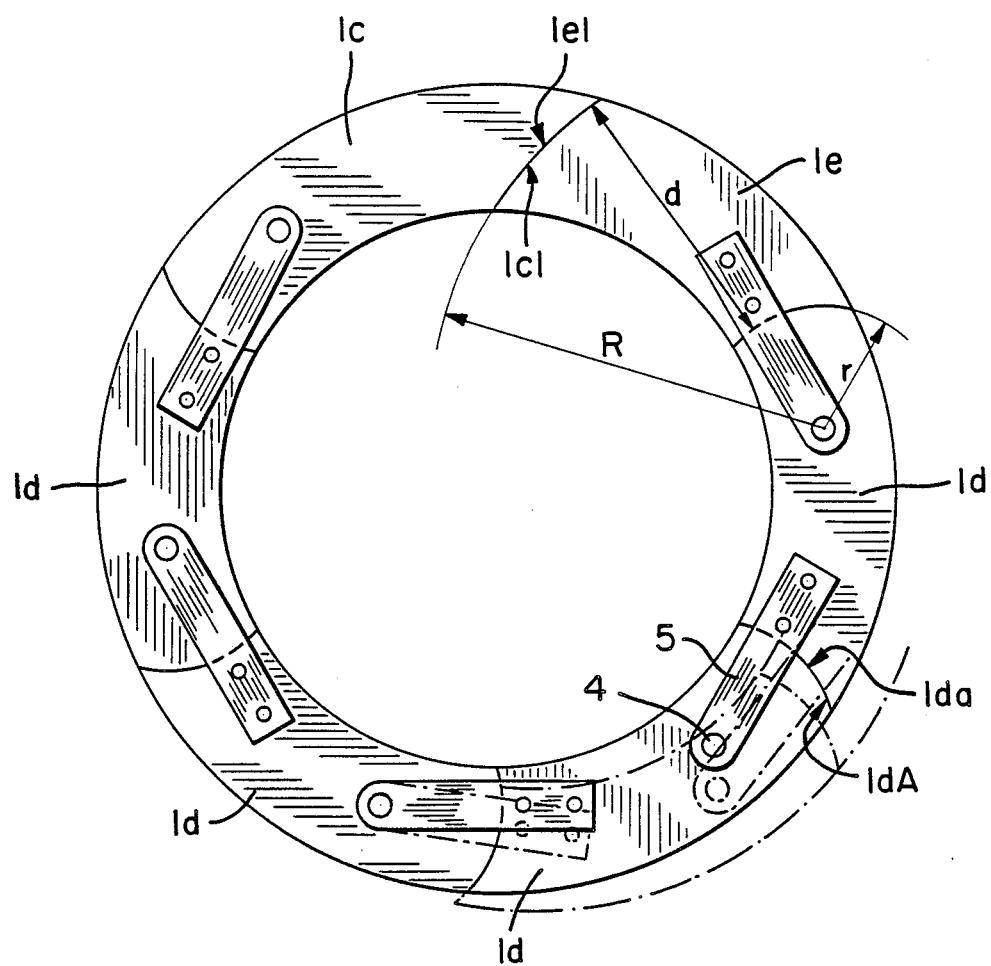
FIG. 7 is a plan view of the peripheral ring of segments, in closed position, according to a further embodiment of the invention.

FIG. 7 illustrates a further embodiment of a peripheral ring of segments of a mold according to the invention. It is also possible, in accordance with the invention, to obtain a sliding of the transverse faces of the adjacent segments at least during a part of the closing movement of a mold comprising any number n of segments when the segments are connected circumferentially with each other and surround the raw rubber blank to be moded in the manner of a chain. The segment mold of this embodiment of the invention is characterized by the fact that the transverse faces of each segment (1*c*, 1*d*, 1*e*) of the peripheral ring are such that their intersection with any plane perpendicular to an axis of the mold is a circular arc. The peripheral ring of the closed mold is shown in FIG. 7 in solid line. The showing of a segment 1*d* in open position has been superimposed in dashed line. The chain of segments starts with the first segment 1*c*, continues with the segments 1*d*, and terminates with the last segment 1*e*. Each segment except for the first segment (1*c*) is movable in rotation around a pin 4 located in an adjacent segment to which it is connected by an arm 5. Each pin 4 is parallel to the axis of the mold. In order to permit relative movement between the segments, the transverse faces 1*da* and 1*dA* of the adjacent segments in question are defined by the displacement in rotation of a curve contained in a plane passing through and tilting around the axis of rotation. In the simplest variant embodiment, this curve is a straight line and defines a transverse face in the form of a partial cylinder, shown in plan view (FIG. 7) by a circular arc of radius r, r being the distance between each point of a transverse face from the axis of rotation in question. All the transverse faces are thus defined except for the first face 1*c*1 (belonging to the first segment 1*c*) and the last face 1*e*1 (belonging to the last segment 1*e*), which are defined in similar manner, but along the radius R with $R = r + d$, d being the length of the segment, measured in a plane passing through the axis of rotation in question. The reason for this difference in configuration will become more evident with the description below of the closing of a mold constituted in this manner.

The first segment 1c is brought to its closed position. Gradually, by rotation around the pin 4 of the preceding segment, the segments 1d are brought into their closed position, the transverse faces remaining adjoining. Finally, still by rotation around the pin 4 of the preceding segment, the last segment 1e slides between the adjacent segment 1d and the first segment 1c. The closing of this mold is assured while permanently maintaining the transverse faces of the segments adjacent in pairs. At each stage of the closing, the segment which is closed acts in the manner of a piston to push back the raw rubber which has been able to flow upon the closing of the preceding segment. In a variant embodiment, the peripheral ring of segments can be formed by two half chains which are closed one in one circumferential direction and the other in the opposite direction.

We claim:

1. In a mold for molding and vulcanizing a rubber tire from a raw rubber blank within a molding space for the tire defined by:
   (a) a removable rigid core divided into a plurality of segments, each having an exterior surface which together define an interior surface of the tire;
   (b) two side parts movable to closed positions, each having an interior surface which engages the raw rubber blank and in closed position defines an exterior surface of a sidewall of the tire;
   (c) a peripheral ring divided into a plurality of segments movable to closed positions, each having an interior surface which together engage the raw rubber blank and in closed positions define the tread of the tire;
   the improvement which comprises:
   complementary, interfacing slide surfaces formed on the side parts and the segments of the peripheral ring and on adjacent segments of the peripheral ring, said slide surfaces extending in parallel relation to the molding space so that relative sliding motion between the slide surfaces, at least during the final phase of closing movement, pushes raw rubber of the blank into the molding space and prevents raw rubber from flowing between the complementary, interfacing, slide surfaces.

2. A mold according to claim 1, wherein the interfacing surfaces of each side part and the peripheral ring of segments lie in a plane perpendicular to an axis of the mold.

3. A mold according to claim 1, wherein the interfacing surfaces of each side part and the peripheral ring of segments lie in a cylinder an axis of which is identical to that of the mold.

4. In a mold for molding and vulcanizing a rubber tire from a raw rubber blank within a molding space for the tire defined by:
   (a) a removable rigid core divided into a plurality of segments, each having an exterior surface, which together define an interior surface of the tire;
   (b) two side parts movable to closed positions, each having an interior surface which engages the raw rubber blank and in closed position defines an exterior surface of a sidewall of the tire;
   (c) a peripheral ring divided into a plurality of segments movable to closed positions, each having an interior surface which together engage the raw rubber blank and in closed positions define the tread of the tire;
   the improvement which comprises:
   complementary, interfacing slide surfaces formed on the side parts and the segments of the peripheral ring and on adjacent segments of the peripheral ring, said slide surfaces extending in parallel relation to the molding space so that relative sliding motion between the slide surfaces, at least during the final phase of closing movement, pushes raw rubber of the blank into the molding space and prevents raw rubber from flowing between the complementary, interfacing slide surfaces;
   and two types of alternately arranged segments making up the peripheral ring, the first type of segments having transverse faces parallel to each other and the second type of segments having, when the mold is in closed position, transverse faces which adjoin the preceding transverse faces.

5. In a mold for molding and vulcanizing a rubber tire from a raw rubber blank within a molding space for the tire defined by:
   (a) a removable rigid core divided into a plurality of segments, each having an exterior surface, which together define an interior surface of the tire;
   (b) two side parts movable to closed positions, each having an interior surface which engages the raw rubber blank and in closed position defines an exterior surface of a sidewall of the tire;
   (c) a peripheral ring divided into a plurality of segments movable to closed positions, each having an interior surface which together engage the raw rubber blank and in closed positions define the tread of the tire;
   the improvement which comprises:
   complementary, interfacing slide surfaces formed on the side parts and the segments of the peripheral ring and on adjacent segments of the peripheral ring, said slide surfaces extending in parallel relation to the molding space so that relative sliding motion between the slide surfaces, at least during the final phase of closing movement, pushes raw rubber of the blank into the molding space and prevents raw rubber from flowing between the complementary, interfacing slide surfaces;
   and two types of alternately arranged segments making up the peripheral ring, the first type of segments having transverse faces, radial projections of which have an intersection radially outward of the mold, and the second type of segments having, when the mold is in closed position, transverse faces which adjoin the preceding transverse faces.

6. In a mold for molding and vulcanizing a rubber tire from a raw rubber blank within a molding space for the tire defined by:
   (a) a removable rigid core divided into a plurality of segments, each having an exterior surface, which together define an interior surface of the tire;
   (b) two side parts movable to closed positions, each having an interior surface which engages the raw rubber blank and in closed position defines an exterior surface of a sidewall of the tire;
   (c) a peripheral ring divided into a plurality of segments movable to closed positions, each having an interior surface which together engage the raw rubber blank and in closed positions define the tread of the tire;
   the improvement which comprises:

complementary, interfacing slide surfaces formed on the side parts and the segments of the peripheral ring and on adjacent segments of the peripheral ring, said slide surfaces extending in parallel relation to the molding space so that relative sliding motion between the slide surfaces, at least during the final phase of closing movement, pushes raw rubber of the blank into the molding space and prevents raw rubber from flowing between the complementary, interfacing, slide surfaces; and segments making up the peripheral ring wherein the transverse faces of each segment are such that their intersection with any plane perpendicular to an axis of the mold is a circular arc.

7. In a mold for molding and vulcanizing a rubber tire from a raw rubber blank within a molding space for the tire defined by:
(a) a removable rigid core divided into a plurality of segments, each having an exterior surface which together define an interior surface of the tire;
(b) two side parts movable to closed positions, each having an interior surface which engages the raw rubber blank and in closed position defines an exterior surface of a sidewall of the tire;
(c) a peripheral ring divided into a plurality of segments movable to closed positions, each having an interior surface which together engage the raw rubber blank and in closed positions define the tread of the tire;

the improvement which comprises:
complementary, interfacing slide surfaces formed on the side parts and the segments of the peripheral ring and on adjacent segments of the peripheral ring, said slide surfaces extending in parallel relation to the molding space so that relative sliding motion between the slide surfaces, at least during the final phase of closing movement, pushes raw rubber of the blank into the molding space and prevents raw rubber from flowing between the complementary, interfacing slide surfaces;
a cylindrical, radially inner face formed on said rigid core; an extension carried by each side part which projects beyond a zone assuring the molding of a radial inner surface of a bead of the tire; and a cylindrical face formed on the extension so that the extension of each side part can slide along the cylindrical radially inner face of the rigid core.

8. In a mold for molding and vulcanizing a rubber tire from a raw rubber blank within a molding space for the tire defined by:
(a) a removable rigid core divided into a plurality of segments, each having an exterior surface which together define an interior surface of the tire;
(b) two side parts movable to closed positions, each having an interior surface which engages the raw rubber blank and in closed position defines an exterior surface of a sidewall of the tire;
(c) a peripheral ring divided into a plurality of segments movable to closed positions, each having an interior surface which together engage the raw rubber blank and in closed positions define an exterior surface of a sidewall of the tire;

the improvement which comprises:
complementary, interfacing, slide surfaces formed on the side parts and the segments of the peripheral ring and on adjacent segments of the peripheral ring, said slide surfaces extending in parallel relation to the molding space so that relative sliding motion between the slide surfaces, at least during the final phase of closing movement, pushes raw rubber of the blank into the molding space and prevents raw rubber from flowing between the complementary, interfacing, slide surfaces; and
complementary interfacing, slide surfaces formed on the rigid core and the side parts so that relative sliding motion between the slide surfaces, at least during the final phase of closing movement of the side parts, prevents the formation of burrs on the tire.

9. A process for manufacturing a rubber tire in a rigid mold which imparts the final shape and dimensions to the tire, said rigid mold including a removable rigid core assembled from rigid segments for molding the interior surface of the tire, two side parts for molding the exterior sidewalls of the tire and a peripheral ring divided into a plurality of segments having transverse surfaces for molding the exterior tread, said process comprising the steps of building the blank of the tire to be molded on the assembled rigid core segments and thereafter closing the two side parts and peripheral ring segments of the mold while moving the transverse surfaces of adjacent segments of the ring in flush sliding engagement and while moving the contact surfaces between the ring and the side parts in flush sliding engagement.

* * * * *

UNITED STATES PATENT AND TRADEMARK OFFICE
CERTIFICATE OF CORRECTION

PATENT NO. : 4,895,692

DATED : January 23, 1990

INVENTOR(S) : Laurent et al.

It is certified that error appears in the above-identified patent and that said Letters Patent is hereby corrected as shown below:

Col. 4, line 28, "logger" should read --longer--;

Col. 5, line 15, "extension" should read --extensions--; and

Col. 6, line 39, "moded" should read --molded--.

Signed and Sealed this

Ninth Day of July, 1991

Attest:

HARRY F. MANBECK, JR.

Attesting Officer

Commissioner of Patents and Trademarks